United States Patent
Matsushita

(10) Patent No.: US 6,717,098 B2
(45) Date of Patent: Apr. 6, 2004

(54) APPARATUS AND METHOD FOR LASER BEAM WELDING

(75) Inventor: Naohisa Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/271,581

(22) Filed: Oct. 17, 2002

(65) Prior Publication Data
US 2003/0173341 A1 Sep. 18, 2003

(30) Foreign Application Priority Data
Mar. 14, 2002 (JP) ........................................ 2002-070516

(51) Int. Cl.$^7$ .............................................. B23K 26/00
(52) U.S. Cl. .......................... 219/121.63; 219/121.64; 219/121.83
(58) Field of Search ...................... 219/121.63, 121.64, 219/121.83, 121.85, 121.6

(56) References Cited

U.S. PATENT DOCUMENTS

| | | | | |
|---|---|---|---|---|
| 3,986,391 A | * | 10/1976 | Vahaviolos | .................. 73/781 |
| 4,007,631 A | * | 2/1977 | Saifi et al. | .................... 73/587 |
| 4,086,817 A | * | 5/1978 | Jon et al. | ...................... 73/587 |
| 5,434,382 A | | 7/1995 | Schlattl et al. | |
| 6,313,427 B1 | | 11/2001 | Suita | |

FOREIGN PATENT DOCUMENTS

| | | |
|---|---|---|
| JP | 6-190566 | 7/1994 |
| JP | 9-248687 | 9/1997 |
| JP | 2000-158147 | 6/2000 |

* cited by examiner

*Primary Examiner*—M. Alexandra Elve
(74) *Attorney, Agent, or Firm*—Staas & Halsey LLP

(57) ABSTRACT

A laser beam welding apparatus includes a component holding unit which holds components that are to be welded. A laser irradiation unit performs welding of the components by irradiating a welding laser beam to a welding zone of the components. A stress detection unit detects stress data that indicate a stress condition of the components held by the component holding unit. A stress correction unit controls irradiation of a correcting laser beam to the welding zone, based on a result of comparison between reference stress data, detected when positions of the components are aligned in proper position before the welding, and post-welding stress data, detected after the welding is performed by the laser irradiation unit, so that the post-welding stress data, obtained after the irradiation of the correcting laser beam, matches with the reference stress data.

8 Claims, 9 Drawing Sheets

WELDING POINTS

APPARATUS AND METHOD FOR LASER BEAM WELDING

BACKGROUND OF THE INVENTION

1. Field of the Invention

The present invention relates to an apparatus and method for laser beam welding that is appropriate for welding of components that need alignment of the positions of the components prior to welding.

2. Description of the Related Art

With the increase of the capacity of data communications and the improvement of the transmission speed, the demand for development of the field in which optical-device components are dealt with is increasing. In the manufacture of optical devices for optical communications, it is required that a light-emitting component (e.g. a laser diode) and a light-receiving component (e.g. a photodiode) are suitably positioned with high precision. In order to stabilize the communication quality, it is necessary that the optical devices including the light-emitting components and the light-receiving components are welded after the positioning, so that the light emitted by the light-emitting component is directed accurately to the center of the optical path of the light-receiving component connected to the light emitting component.

Generally, a laser beam welding apparatus is used to perform welding of two or more optical-device components so that a module containing the welded components is produced.

FIG. 1 shows a conventional laser beam welding apparatus which is used for welding of optical-device components.

As shown in FIG. 1, the laser beam welding apparatus 100 includes the upper workholder 103 and the lower workholder 105 which are provided in the housing 101. The upper optical-device component WA and the lower optical-device component WB, which are subjected to the welding, are held by the upper workholder 103 and the lower workholder 105 in the housing 101. Moreover, the workpiece positioning device 107 which performs the positioning of the optical-device component WA is provided at the upper location of the upper workholder 103.

The boundary portion between the optical-device component WA and the optical-device component WB is the welding zone WC where the welding is performed. The two optical-device components WA and WB are welded together by causing the laser irradiation units 110 to emit the laser beams to the welding zone WC in association with the laser oscillator 120.

However, it is impossible to avoid the occurrence of heat deformation as a result of the laser beam welding. Even if alignment for adjusting the positions of the components is performed prior to the laser beam welding, the heat deformation will occur around the peripheral portions of the components. The main cause is that, when performing the laser beam welding, the neighboring portions of the components which are once melt by the welding will be solidified again, and a shrinking force is exerted on the neighboring portions during the re-solidification.

Consequently, misalignment of the optical axes of the optical-device components WA and WB occurs, and it becomes the problem that the optical transmission efficiency in the welded components deteriorates.

Conventionally, in order to avoid the above-mentioned problem, after the laser beam welding is performed, the optical-device components WA and WB are removed from the holders 103 and 105, and a correcting process for the welded components is performed by using a different facility.

In this correcting process, an external force is applied to the welded components from various directions, and a direction of the external force applied in which the optical transmission efficiency is maximized is found out. Then, the laser beam is irradiated to the welded components in the reverse direction to the force application direction, in order to correct the heat deformation. This correcting process is repeated until the positions of the components are fixed to the optimum positions to attain the maximum efficiency of optical transmission.

FIG. 2A, FIG. 2B and FIG. 2C are diagrams for explaining a laser beam welding process by which two optical-device components are welded together.

When welding the components WA and WB, the relative positions thereof are adjusted so that the maximum output of the optical transmission may be obtained, as shown in FIG. 2A. Especially in the case of the optical-device components, the two components are welded and the position adjustment is performed such that the relative positions of the welded components are adjusted to the optimum positions where the optical transmission efficiency is the maximum and the output optical power is the maximum.

However, as described above, if the components are welded by the laser beam, the welding zone WC will suffer a thermal deformation. For example, FIG. 2B shows the case where the optical-device components WA and WB are welded at four welding points including the upper, lower, right and left sides.

FIG. 2C shows changes of the misalignment (the solid line) and changes of the output optical power (the fill pattern line) in the welded components when the laser beam welding process is performed in the numerical order indicated in FIG. 2B.

As shown in FIG. 2C, if the welding indicated by the numerical letter "1" is performed after the alignment process is performed, the misalignment will occur. The misalignment is not canceled even if the welding is subsequently performed as indicated by the numerical letters 2, 3 and 4 so that it becomes symmetrical. Moreover, it is confirmed that the output optical power is attenuated with the misalignment, although the output optical power before the welding was is the maximum.

Therefore, in the conventional laser beam welding, the optical-device components after the welding are removed from the holders, and the correction process is performed by using a separate facility that is different from the welding apparatus.

As described above, in the correcting process, an external force is applied to the welded components from various directions, and a direction of the external force applied in which the optical transmission efficiency is maximized is found out. This correcting operation largely relies on the experience and admiration of a veteran operator.

FIG. 3A and FIG. 3B show a correcting operation for the optical-device components which are welded as the result of the welding process.

As shown in FIG. 3A, the correcting operation is actually performed such that one of the welded components (e.g., the component WB), is held by the holder 130, and the direction in which the output optical power becomes the maximum when the other component WA is pushed by the finger is checked.

After the confirmation of the direction with the maximum optical power is made, the laser for correction is irradiated to the welded components in the opposite direction (the direction is shifted 180 degrees) to the confirmed direction, as shown in FIG. 3B.

If the optical power is raised when the component WA is pushed by the finger, the portion in contact with the finger includes a contractile deformation. It can be conceived that such portion receives the correcting force and the deformation is corrected. Generally, it is known that when the portion of the components is subjected to laser irradiation, the portion is thermally contracted. For this reason, after the confirmation of the direction with the maximum optical power is made, the laser for correction is irradiated to the welded components in the opposite direction.

The confirmation of the direction with the maximum optical power and the correction with the laser irradiation in the opposite direction are repeated until the output optical power that approaches the maximum optical power obtained by the alignment before the welding is obtained. Even if a veteran operator performs the correcting operation, it takes several ten minutes to complete the correcting operation. Hence, the correcting process which must be performed in the case of the conventional laser beam welding is time consuming.

FIG. 4 shows a conventional laser beam welding method including the welding and correcting processes in which the above explanations are summarized.

As shown in FIG. 4, after the welding of the optical-device components is performed, the conventional laser beam welding method requires the correcting process by removing the optical-device components from the holders and sending the components to a different facility. Namely, it is necessary that the welding process and the correcting process be separately carried out by using different facilities after the alignment process.

Moreover, it is necessary for the conventional laser beam welding method to apply the external force to the welded components in various directions and to find out the direction with the maximum optical power. The correcting process largely replies on the experience and admiration of a veteran operator. Therefore, in the case of the conventional laser beam welding technique, it is difficult for a non-experienced operator to perform exact welding operations, and the automation is difficult to achieve. There is the problem that the quantity of the required welding facilities becomes large and the time needed to complete the welding of optical-device components becomes long.

SUMMARY OF THE INVENTION

An object of the present invention is to provide an improved laser beam welding apparatus and method in which the above-described problems are eliminated.

Another object of the present invention is to provide a laser beam welding apparatus which attains the joining of components in proper position with simple construction.

Another object of the present invention is to provide a laser beam welding method which is performed by the laser beam welding apparatus in order to attain the joining of components in proper position.

The above-mentioned objects of the present invention are achieved a laser beam welding apparatus comprising: a component holding unit which holds components that are welded; a laser irradiation unit which performs welding of the components by irradiating a welding laser beam to a welding zone of the components; a stress detection unit which detects stress data that indicate a stress condition of the components held by the component holding unit; and a stress correction unit which controls irradiation of a correcting laser beam to the welding zone, based on a result of comparison between reference stress data, detected by the stress detection unit when positions of the components are aligned in proper position before the welding, and post-welding stress data, detected by the stress detection unit after the welding is performed by the laser irradiation unit, so that the post-welding stress data, obtained after the irradiation of the correcting laser beam, matches with the reference stress data.

The above-mentioned objects of the present invention are achieved by a laser beam welding method which comprises the steps of: holding components that are welded; performing welding of the components by irradiating a welding laser beam to a welding zone of the components; detecting stress data that indicate a stress condition of the components held; storing reference stress data that are detected when positions of the components are aligned in proper position before the welding; and controlling irradiation of a correcting laser beam to the welding zone, based on a result of comparison between the stored reference stress data and post-welding stress data, detected after the welding is performed, so that the post-welding stress data, obtained after the irradiation of the correcting laser beam, matches with the reference stress data.

In the laser beam welding apparatus of the present invention, the stress correction unit controls the irradiation of a correcting laser beam to the welding zone of the components based on a result of the comparison between the reference stress data and the post-welding stress data, and it is possible to attain the joining of the components in proper position with simple construction.

Moreover, in the laser beam welding apparatus of the present invention, the stress correction unit can automatically recognize the direction of the deformation by using an internal-force measuring sensor provided as the stress detection unit, and it is no longer necessary to perform the correction operation in which an external force is applied to the welded components in various directions and the direction with the maximum optical power is found out.

According to the laser beam welding apparatus of the present invention, the welding of optical-device components and the correction of the deformation can be carried out with a single welding facility, and it is possible to increase the welding work efficiency and reduce the facility cost. Moreover, the stress correction unit carries out the correction of the deformation produced by the welding, and it is possible to attain the automation of the welding of optical-device components.

According to the laser beam welding method of the present invention, in the controlling step, the irradiation of a correcting laser beam to the welding zone is controlled appropriately based on a result of the comparison between the reference stress data and the post-welding stress data. The correction of the deformation produced by the welding is thus carried out, and it is possible to attain the joining of the components in proper position with simple construction. Moreover, the welding of optical-device components and the correction of the deformation are carried out by a series of processes, and it is possible to increase the welding work efficiency.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 5:
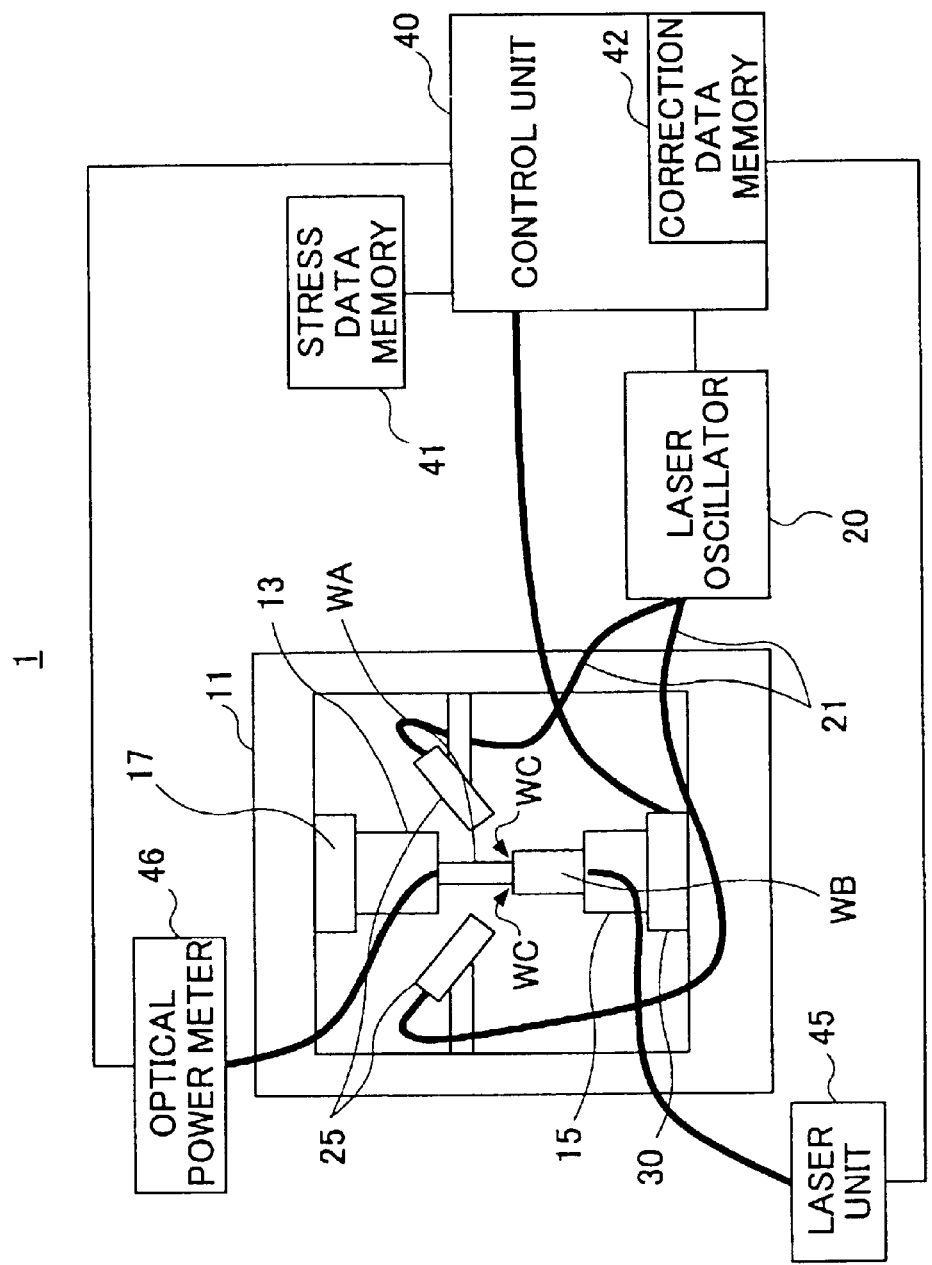
FIG. 5 is a diagram of a first preferred embodiment of the laser beam welding apparatus of the present invention.

FIG. 5 shows a first preferred embodiment of the laser beam welding apparatus according to the present invention.

As shown in FIG. 5, the laser beam welding apparatus 1 is provided with an upper workholder 13 and a lower workholder 15 in a housing 11. The upper workholder 13 and the lower workholder 15 constitute a component holding unit which holds the components that are to be welded.

In the middle of the laser beam welding apparatus 1, an upper optical-device component WA and a lower optical-device component WB are held by the upper workholder 13 and the lower workholder 15, respectively. Although illustration is omitted in FIG. 5, each of the upper workholder 13 and the lower workholder 15 is provided with chucks or the like which are used to sandwich the optical-device component WA or WB. The upper workholder 13 and the lower workholder 15 can hold the components in a fixed posture by means of the checks.

Moreover, in the laser beam welding apparatus 1, a workpiece position adjusting device 17 is provided above the upper workholder 13 in order for adjusting the relative position of the optical-device component WA to the optical-device component WB. By rotating the workpiece position adjusting device 17 to change the held position of the optical-device component WA, the relative position of the optical-device component WA to the optical-device component WB can be set up in proper position.

Moreover, in the laser beam welding apparatus 1, a laser beam generated at the laser oscillator 20 is transmitted to both the laser irradiation units 25 through the optical fibers 21. The two optical-device components WA and WB are welded together by causing the laser irradiation units 25 to emit the laser beams to the welding zone WC in association with the laser oscillator 20.

Figure 1:
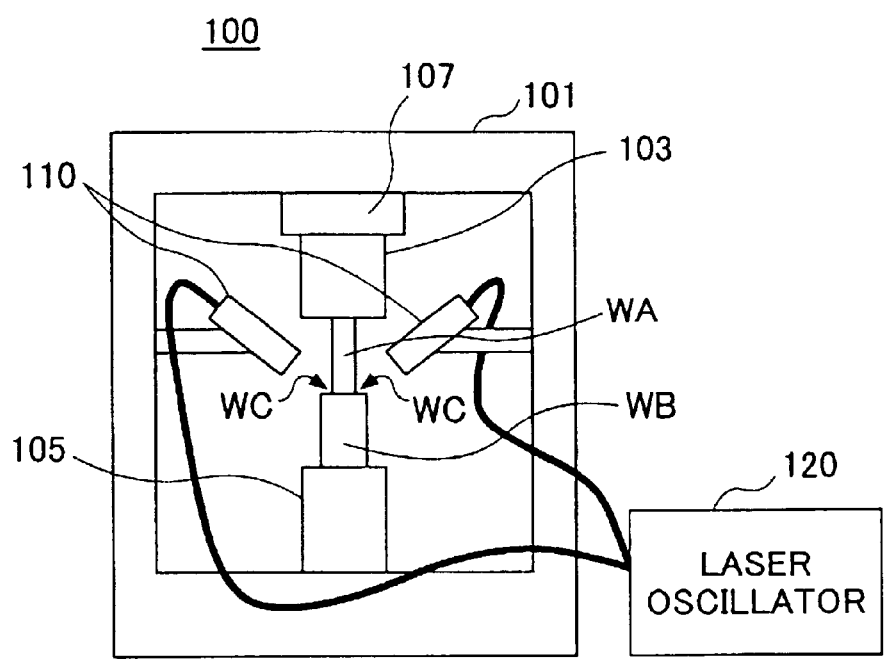
FIG. 1 is a diagram of a conventional laser beam welding apparatus for the welding of optical-device components.
Figure 2A:
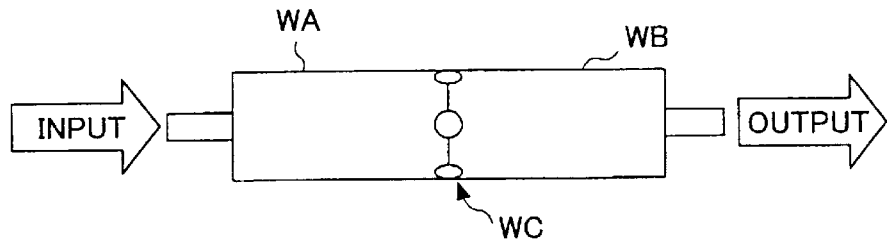
FIG. 2A, FIG. 2B and FIG. 2C are diagrams for explaining a laser beam welding process in which two optical-device components are welded.
Figure 2B:
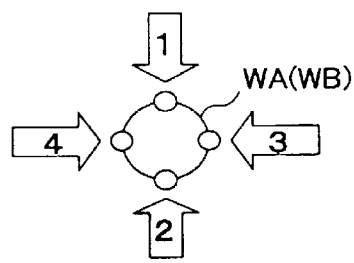
Figure 2C:
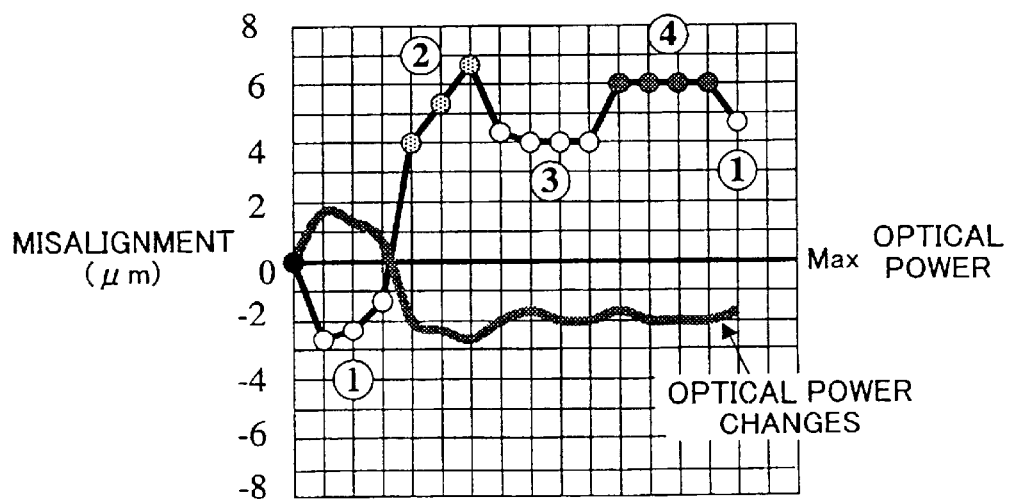
Figure 3A:
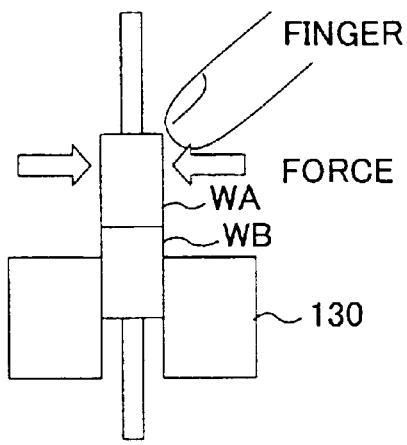
FIG. 3A and FIG. 3B are diagrams for explaining a correcting operation which is performed for the optical-device components which are welded.
Figure 3B:
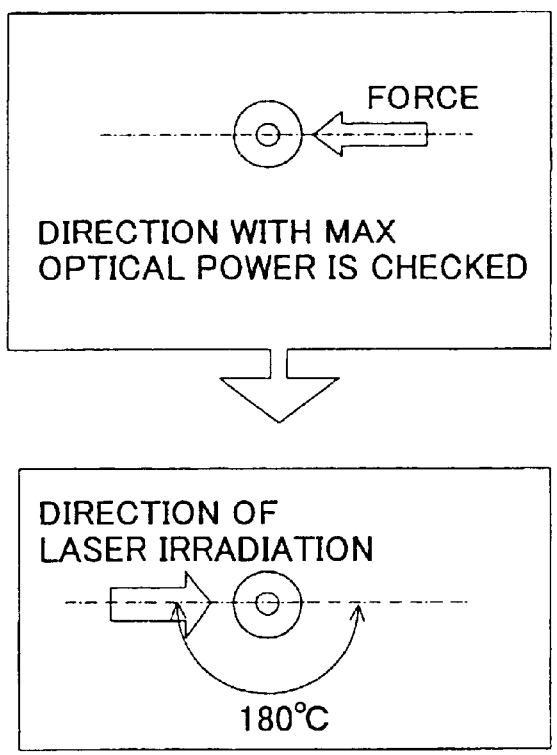
Figure 4:
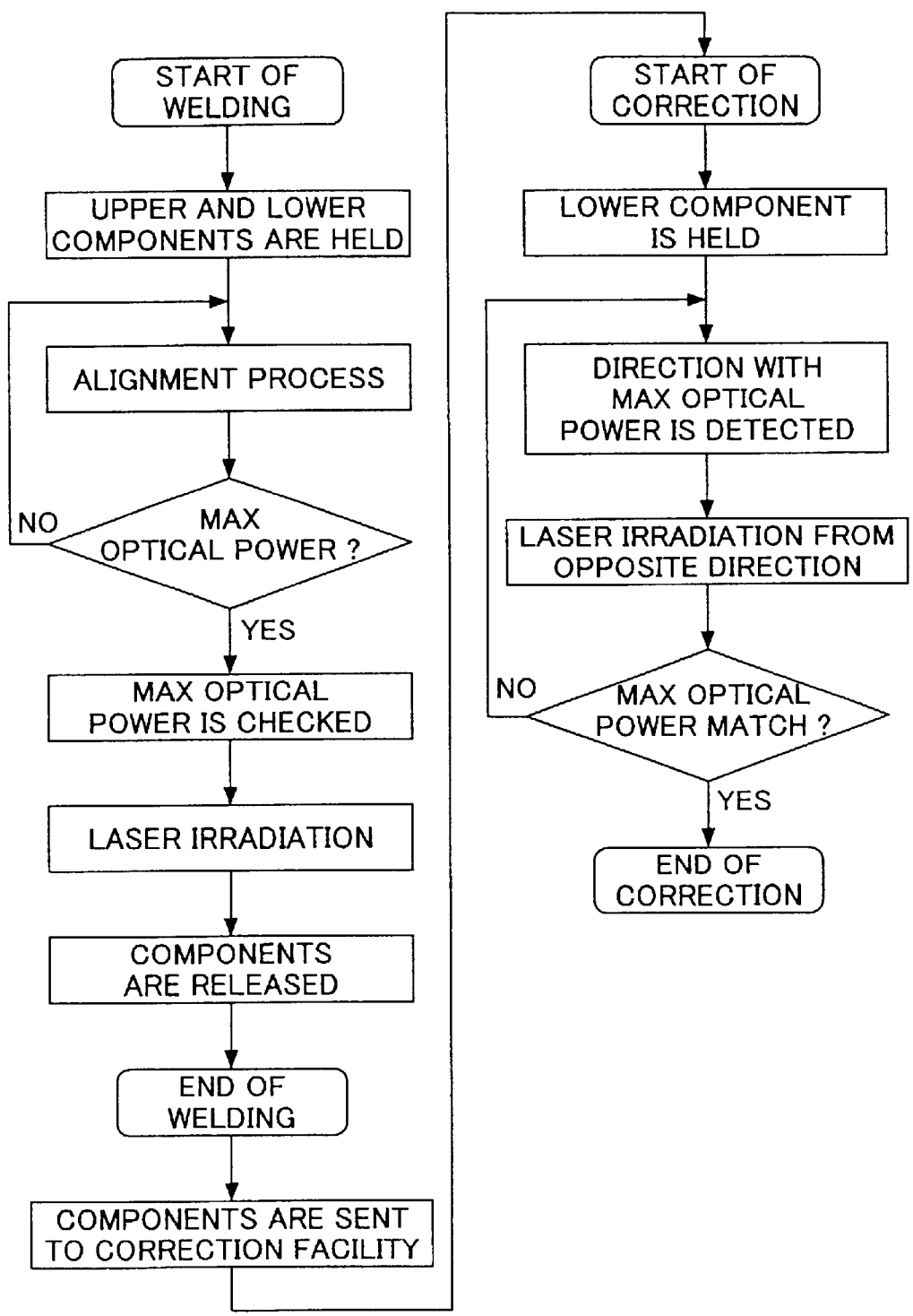
FIG. 4 is a flowchart for explaining a conventional laser beam welding method including welding and correcting processes.

The above-described configuration of the laser beam welding apparatus 1 of FIG. 5 is essentially the same as that of the conventional laser beam welding apparatus of FIG. 1.

Apart from the conventional laser beam welding apparatus, the laser beam welding apparatus 1 of the present embodiment is equipped with a novel and useful mechanism for correcting the deformation produced by the welding, without removing the welded optical-device components WA and WB from the holders. A description will now be given of such mechanism of the laser beam welding apparatus 1 of the present embodiment.

In the laser beam welding apparatus 1 of FIG. 5, a 6-axis internal-force measuring sensor 30 is provided on the bottom of the lower workholder 15. The 6-axis internal-force measuring sensor 30 constitutes a stress detection unit which detects stress data indicative of a stress condition of the optical-device components WA and WB.

As the stress detection unit, the 6-axis internal-force measuring sensor 30 outputs the six stress components: the x-axis axial stress X, the x-axis torsional moment X θ, the y-axis axial stress Y, the y-axis torsional moment Y θ, the z-axis axial stress Z, and the z-axis torsional moment Z θ. These stress components output by the 6-axis internal-force measuring sensor 30 are indicative of a 3-dimensional stress condition of the welded components. Concerning the 6-axis internal-force measuring sensor 30, it is assumed that the z-axis is set in conformity with the height direction of the components WA and WB joined together is the z-axis, and the x-axis and the y-axis are set on an imaginary plain orthogonal to the z-axis.

The 6-axis internal-force measuring sensor 30 is provided to detect through the lower workholder 15 the stress data based on the reaction force to the deformation present on the optical-device components WA and WB. The output data of the 6-axis internal-force measuring sensor 30 are supplied to a control unit 40 in the laser beam welding apparatus 1.

Moreover, in the laser beam welding apparatus 1 of the present embodiment, a laser unit 45 and an optical power meter 46 are provided in order to confirm that the relative positions of the components WA and WB are aligned in the proper position where the optical transmission efficiency is the maximum. The laser unit 45 is provided as a light-emitting component for the alignment confirmation, and the optical power meter 46 is provided as a light-receiving component for the alignment confirmation. As shown in FIG. 5, an alignment-checking laser beam generated at the laser unit 45 is transmitted to the bottom of the lower optical-device component WB The alignment-checking laser beam is transmitted through the optical-device components WA and WB in the axial direction. The optical power meter 46 receives the alignment-checking laser beam from the top of the upper optical-device component WA, and detects the optical power of the received laser beam. The output data of the optical power meter 46 is supplied to the control unit 40.

When the optical transmission efficiency obtained at the optical power meter 46 is the maximum (or when the detected optical power of the received laser beam is the maximum), the control unit 40 determines that the relative positions of the optical-device components WA and WB are aligned in proper position. Namely, when the optical transmission efficiency is the maximum, the control unit 40 determines that the alignment of the positions of the components WA and WB is suitably performed.

The laser beam welding apparatus 1 of the present embodiment is equipped with the control unit 40 which controls the performance of a series of alignment, welding and correction processes by the laser beam welding apparatus 1.

The control unit 40 controls the performance of the welding and correcting processes in the laser beam welding by receiving the output data of the 6-axis internal-force measuring sensor 30 and the output data of the optical power meter 46. During the performance of the welding and correcting processes, the control unit 40 controls the irradiation of the alignment-checking laser beam by the laser unit 45 and the irradiation of the laser beam by the laser oscillator 20. In order to achieve the above control functions, the control unit 40 is provided to constantly supervise the stress condition of the optical-device components WA and WB by receiving the stress data from the 6-axis internal-force measuring sensor 30 on real time.

Moreover, the control unit 40 is provided with a stress data memory 41, and the control unit 40 receives the stress data from the 6-axis internal-force measuring sensor 30 and stores them into the stress data memory 41.

Furthermore, the control unit 40 is provided with a stress correction function to correct the deformation produced by the laser beam welding. In the laser beam welding apparatus 1, the optical-device components WA and WB, held by the holders 13 and 15, are aligned by using the workpiece position adjusting device 17 prior to the laser beam welding, so that the positions of the components WA and WB are in proper position.

When the above alignment process is performed the output data of the 6-axis internal-force measuring sensor 30 is supplied to the control unit 40 as reference stress data. This reference stress data is the stress data that are detected by the 6-axis internal-force measuring sensor 30 when the optical power detected by the optical power meter 46 is the maximum. In other words, the reference stress data, received by the control unit 40 at this time, are the stress data indicative of the optimal positions of the optical-device components WA and WB. The control unit 40 stores this reference stress data into the stress data memory 41.

After the reference stress data are stored, the welding of the components WA and WB is performed in the laser beam welding apparatus 1 by irradiating the welding laser beams to the welding zone WC of the components WA and WB. The stress data, which are detected by the 6-axis internal-force measuring sensor 30 after the welding is performed, are also supplied to the control unit 40 as the post-welding stress data.

When the post-welding stress data are received, the control unit 40 compares the post-welding stress data with the stored reference stress data, in order to check a stress condition of the welded components WA and WB which may be changed by the deformation due to the laser beam welding.

Based on a result of the comparison between the post-welding stress data and the reference stress data, the control unit 40 controls the laser oscillator 20 and causes the laser irradiation units 25 to irradiate correcting laser beams to the welding zone WC of the welded components WA and WB in order to correct the deformation. The above procedure is repeated by the control unit 40 until the post-welding stress data, obtained after the irradiation of the correcting laser beams, are in agreement with the reference stress data. Hence, the deformation produced by the laser beam welding is corrected, and it is possible that the control unit 40 attains the joining of the components WA and WB in proper position.

By comparing the post-welding stress data with the reference stress data, the control unit 40 confirms a stress change produced by the laser beam welding, and specifies the direction and force by the deformation present on the welding zone WC of the welded components WA and WB. Based on the result of the stress data comparison, the control unit 40 determines the intensity and the direction of the correcting laser beams to be irradiated. While supervising the stress data output by the 6-axis internal-force measuring sensor 30 on real time, the control unit 40 controls the laser oscillator 20 and causes the laser irradiation units 20 to irradiate the correcting laser beams to the welding zone WC of the welded components WA and WB in order to correct the deformation. As described above, the control unit 40 continues to perform the above-mentioned correcting process until the post-welding stress data, obtained after the irradiation of the correcting laser beams, match with the reference stress data. During the correcting process, the control unit 40 supervises the stress data detected by the internal-force measuring sensor 30 on real time.

In the above-described embodiment, the matching of the post-welding stress data and the reference stress data does not mean strict coincidence of the numerical values of the stress data. It is possible to configure the control unit 40 such that, when the post-welding stress data falls within a suitable range of the reference stress data, the control unit 40 determines that the post-welding stress data matches with the reference stress data.

In the present embodiment, the control unit 40 is provided with a correction data memory 42 in order to carry out the correction of the deformation described above. In the correction data memory 42, a stress-correction database for specifying the intensity and the direction of a correcting laser beam to be irradiated when the post-welding stress data differ from the reference stress data is stored.

The stress-correction database, stored in the correction data memory 42, is prepared by collecting and summarizing the data for specifying the intensity and the direction of the correcting laser bean, which has been obtained as a result of actual laser beam welding operations or simulations. The control unit 40 can control the laser oscillator 20 by referring to the stress-correction database of the memory 42, and can cause the laser irradiation units 25 to irradiate the correcting laser beams to the welding zone WC as described above. Through the repetition of the correcting process, the post-welding stress data detected by the 6-axis internal-force measuring sensor 30 may approach the reference stress data.

Since the control unit 40 actually controls the irradiation of the correcting laser beams and corrects the above-mentioned deformation, new stress-correction data can be obtained during the correcting process. Therefore, it is desirable to set up so that the existing stress-correction database may be updated using such actual stress-correction data obtained during the correcting process. According to such configuration, it is possible that the control unit 40 provides the still more desirable correction of the deformation.

Alternatively, it is possible that the correction data memory 42 may not be provided and the stress-correction database may be stored in the stress data memory 41 together with the reference stress data.

Figure 6:
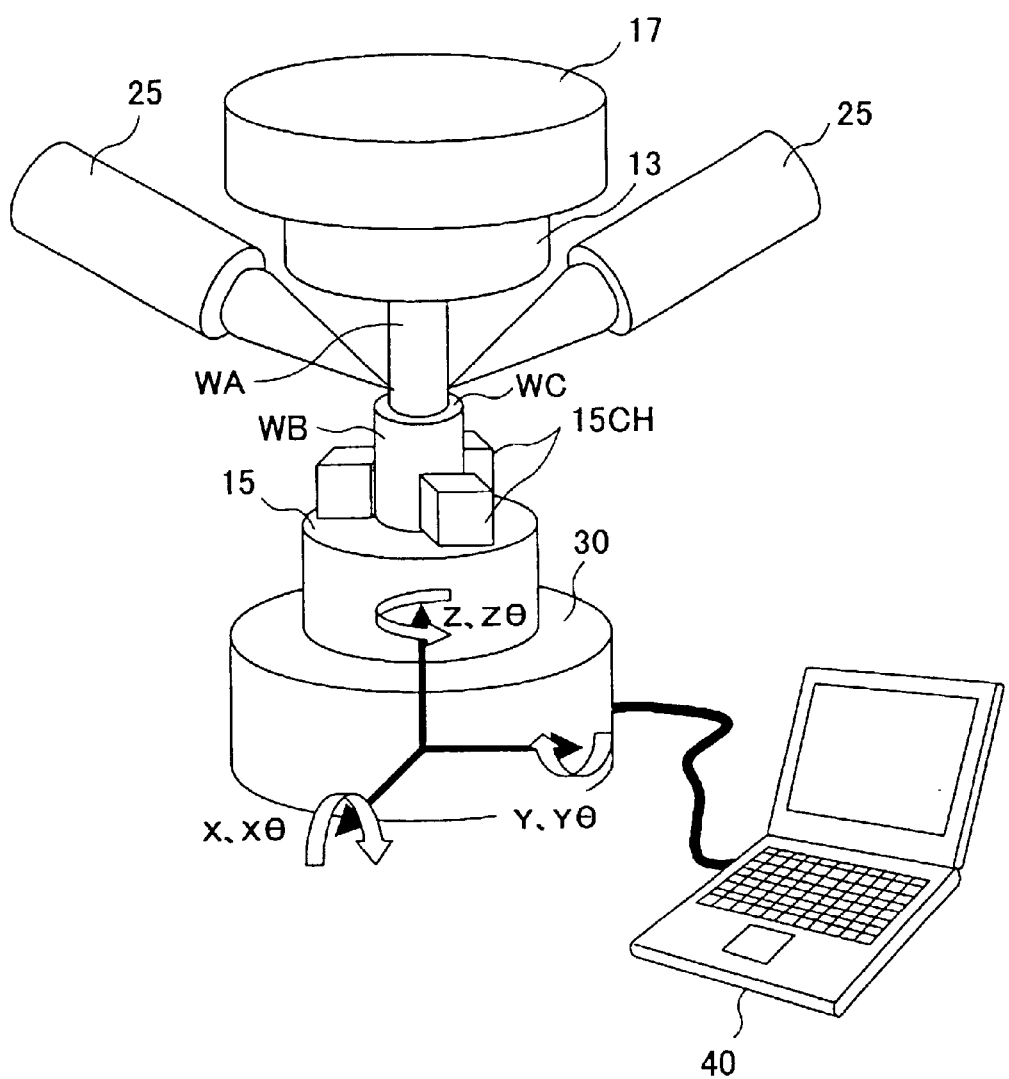
FIG. 6 is a perspective view of the main part of the laser beam welding apparatus of FIG. 5.

FIG. 6 is a perspective view of the main part of the laser beam welding apparatus 1 of FIG. 5.

As shown in FIG. 6, the 6-axis internal-force measuring sensor 30 outputs the six stress components: the x-axis axial stress X, the x-axis torsional moment $X\theta$, the y-axis axial stress Y, the y-axis torsional moment $Y\theta$, the z-axis axial stress Z, and the z-axis torsional moment $Z\theta$. These stress components output by the 6-axis internal-force measuring sensor 30 are indicative of a 3-dimensional stress condition of the welded components.

Moreover, as shown in FIG. 6, the lower workholder 15 is provided with the chucks 15 CH, which are engaged with the lower optical-device component WB when the lower optical-device component WB is held by the lower workholder 15.

In the laser beam welding apparatus of FIG. 6, the control unit 40 described above is constituted by a notebook-size personal computer. The stress data memory 41 and the correction data memory 42, which are described above, are constituted by the RAM in the personal computer 40. The operator can supervise the stress condition of the optical-device components WA and WB on the display panel of the personal computer 40.

In the above-described embodiment of FIG. 5 and FIG. 6, only two laser irradiation units 25 are provided in the laser beam welding apparatus for the purpose of illustration. Alternatively, four or six laser irradiation units 25 may be provided in the laser beam welding apparatus in a symmetrical formation when necessary.

Figure 7:
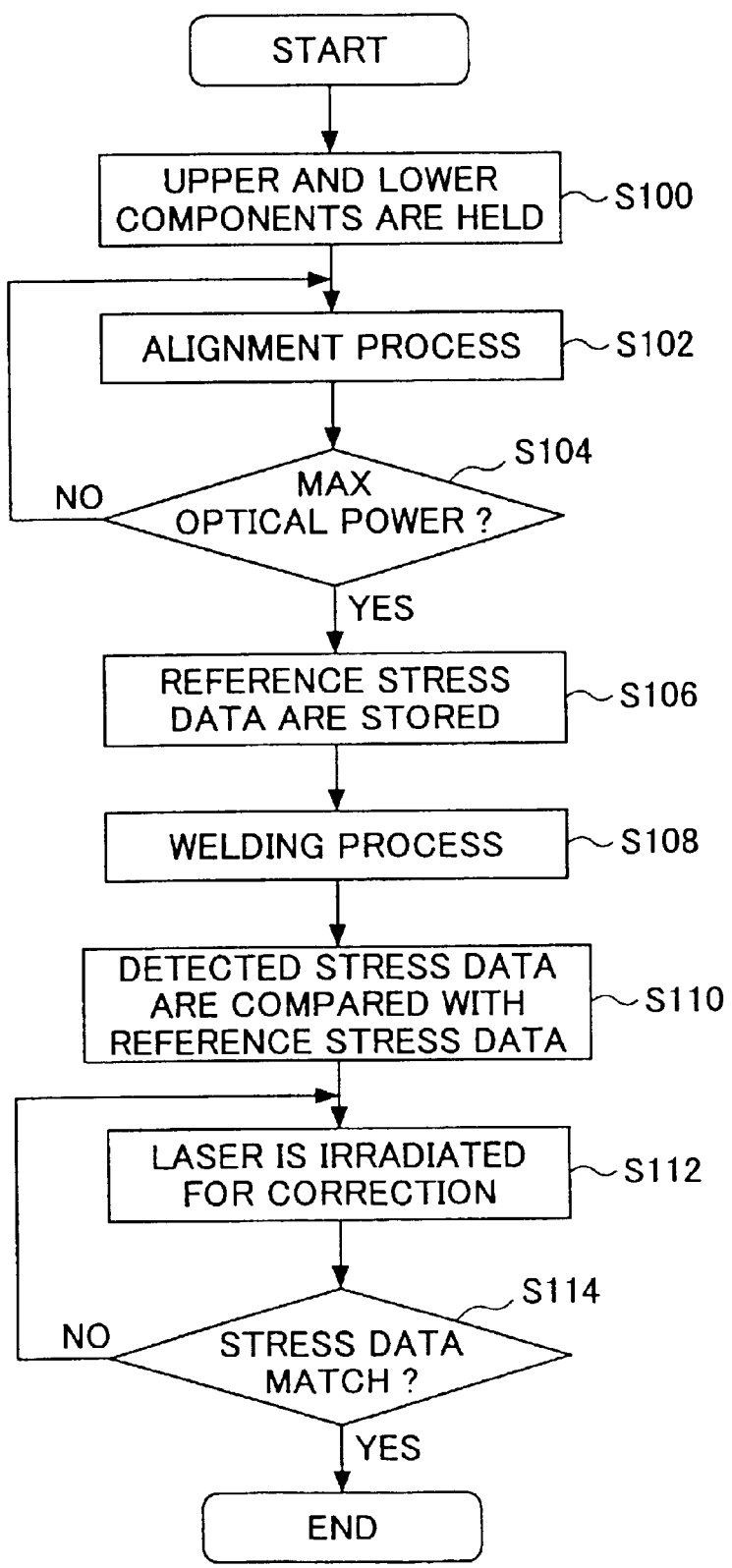
FIG. 7 is a flowchart for explaining a laser beam welding method of the present invention including aligning, welding and correcting processes which are performed by using the laser beam welding apparatus of FIG. 5.

FIG. 7 shows the laser beam welding method including the aligning, welding and correcting processes which are carried out by the laser beam welding apparatus 1 of FIG. 5.

As shown in FIG. 7, at a start of the laser beam welding, the upper optical-device component WA and the lower optical-device component WB are held by the upper workholder 13 and the lower workholder 15, respectively (S100). After the step S100 is performed, the aligning process is performed (S102).

While the aligning process of the step S102 is performed, the relative positions of the optical-device components WA and WB, held by the holders 13 and 15, are adjusted so that the optical power detected by the optical power meter 46 can be the maximum (S104).

When the aligning process is completed, the control unit 40 receives the stress data from the 6-axis internal-force measuring sensor 30 and stores them into the stress data memory 41 as reference stress data (S106).

After the step S106 is performed, the control unit 40 performs the welding process by controlling the laser oscillator 20 and irradiating the laser beams to the welding zone WC of the optical-device components WA and WB (S108).

After the step S108 is performed, in order to check a stress condition of the welded components, the control unit 40 compares the detected stress data from the 6-axis internal-force measuring sensor 30 with the reference stress data stored in the stress data memory 41 (S110).

Based on the result of the stress data comparison, the control unit 40 controls the laser oscillator 20 and causes the laser irradiation units 25 to irradiate the correcting laser beams to the welding zone WC of the welded components such that the detected stress data from the 6-axis internal-force measuring sensor 30 match with the reference stress data (S112).

After the step S112 is performed, the control unit 40 determines whether the detected stress data match with the reference stress data (S114). When the result of the step S114 is negative, the control is transferred to the above steps S112 and S114, and the irradiation of the correcting laser beams and the stress data comparison are repeated. This procedure is repeated until the result of the step S114 becomes affirmative.

When the result of the step S114 is affirmative, the laser beam welding method of the present embodiment ends.

Consequently, the detected stress data, which are output by the 6-axis internal-force measuring sensor 30 on real time, are in agreement with the reference stress data, and it is possible to attain the joining of the optical-device components in proper position with simple construction.

Figure 8:
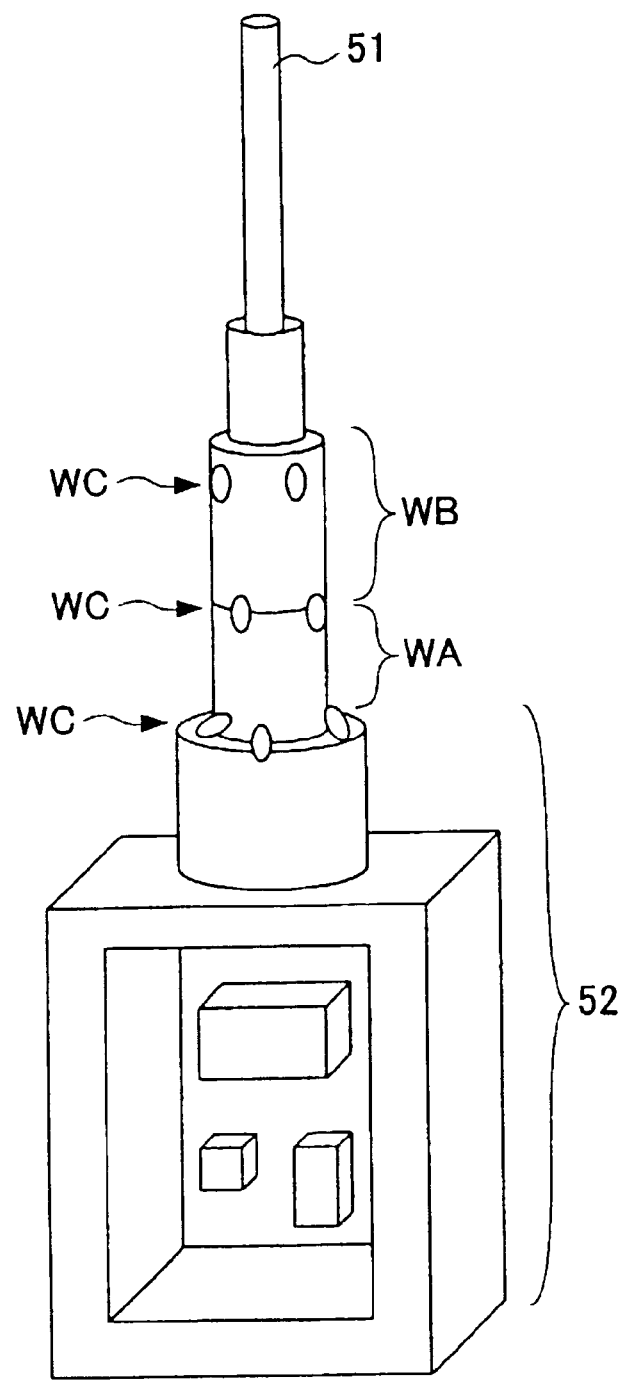
FIG. 8 is a diagram showing the assembly of optical-device components which is produced through the welding of the components with different configurations.

FIG. 8 shows the assembly of the optical-device components which is produced through the welding of the components having a different configuration.

The assembly of the optical-device components as shown in FIG. 8 can also be produced by using the laser beam welding apparatus 1 of the first preferred embodiment.

The assembly of FIG. 8 is produced by assembling the optical fiber 51, the module case 52 containing the light-emitting component, and the optical-device components WA and WB (e.g., lenses). In the assembly of FIG. 8, the optical fiber 51 and the module case 52 are joined together through the optical-device components WA and WB.

The welding process for the assembly of FIG. 8 can be easily performed by using the laser beam welding apparatus 1 only by changing the chucks 15CH of the lower workholder 15 of FIG. 6 to other ones having a different configuration.

When the components that are subjected to the welding are not in a cylindrical configuration, such as in the assembly of FIG. 8, it is desirable to set up the positions of the components so that the center of the welding points may be in agreement with the z-axis. There are three different welding zones WC for the assembly of FIG. 8, and the assembly of the optical-device components in FIG. 8 can be produced by repeating the above-described laser beam welding method including the aligning, welding and correcting processes three times.

Figure 9:
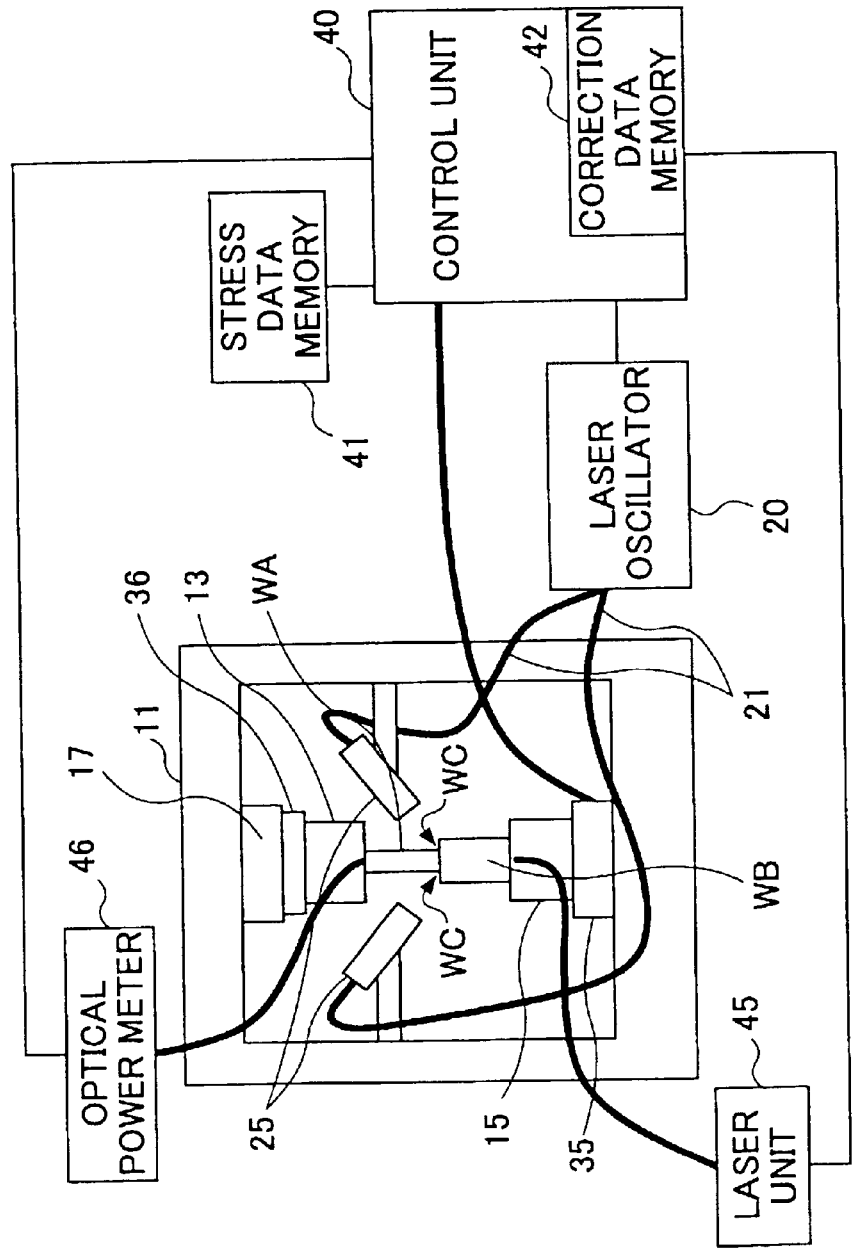
FIG. 9 is a diagram of a second preferred embodiment of the laser beam welding apparatus of the present invention.

FIG. 9 shows a second preferred embodiment of the laser beam welding apparatus according to the present invention.

As shown in FIG. 9, the basic composition of the laser beam welding apparatus 2 of the present embodiment is the same as that of the laser beam welding apparatus 1 of the previous embodiment of FIG. 5. In FIG. 9, the elements that are essentially the same as corresponding elements in FIG. 5 are designated by the same reference numerals, and a description thereof will be omitted to avoid duplicate description.

The laser beam welding apparatus 2 of the present embodiment is equipped with two 2-axis internal-force measuring sensors 35 and 36. The 2-axis internal-force measuring sensors 35 and 36 form the stress detection unit in the laser beam welding apparatus 2.

The 2-axis internal-force measuring sensor 35 is arranged under the lower workholder 15, and the 2-axis internal-force measuring sensor 36 is arranged under the upper workholder 13. Each of the 2-axis internal-force measuring sensors 35 and 36 is connected to the control unit 40 via a cable. For the sake of convenience, only the cable for the 2-axis internal-force measuring sensor 35 is shown but the cable for the 2-axis internal-force measuring sensors 36 is omitted.

Each of the 2-axis internal-force measuring sensors 35 and 36 outputs the two stress components: the x-axis stress X and the y-axis stress Y. The stress components output by each 2-axis internal-force measuring sensor are indicative of a 2-dimensional stress condition of the welded components.

The control unit 40 of the present embodiment is configured so that the two sets of the stress components from the 2-axis internal-force measuring sensors 35 and 36 are combined, and the deformation present on the welded optical-device components WA and WB is specified by the combined stress data. The control unit 40 of the present embodiment carries out the laser beam welding method including the aligning, welding and correcting processes in the same manner as in the first preferred embodiment.

In the above-described embodiment, the two 2-axis axial internal-force measuring sensors 35 and 36 are provided as the stress detection unit. If each of the sensors 35 and 36 is replaced by a 4-axis internal-force measuring sensor or the 6-axis internal-force measuring sensor, then the control unit 40 which receives the detected stress data from such sensors can attain the correction of the deformation and the joining of the optical-device components in proper position with still more sufficient accuracy.

Alternatively, one of the sensors 35 and 36 may be replaced by a one-axis internal-force measuring sensor which outputs the z-axis axial stress Z and the z-axis torsional moment Zθ, and the other of the sensors 35 and 36 may be replaced by a 2-axis internal-force measuring sensor which outputs the 2-dimensional stress data X and Y related to the x-axis and y-axis. Variations and modifications of the stress detection unit may be made without departing from the scope of the present invention when necessary.

As described in the foregoing, according to the laser beam welding apparatus and method of the present invention, the welding of optical-device components and the correction of the deformation can be carried out with a single welding facility, and it is possible to attain the increase of the welding work efficiency and the reduction of the facility cost.

Moreover, the control unit 40 of the laser beam welding apparatus can correct exactly the deformation produced by the welding so that the optical transmission efficiency of the welded components is maximized, and it is no longer necessary to rely on the experience and admiration of a veteran operator in performing the welding of optical-device components.

In the above-described embodiments, the 6-axis, 4-axis or 2-axis internal-force measuring sensors are used as the stress detection unit. However, a stress detection unit of any other form by which a stress condition of the welded components is detectable may be used instead. For example, a strain gage or the like may be used as the stress detection unit.

The present invention is not limited to the above-described embodiments, and variations and modifications may be made without departing from the scope of the present invention.

Further, the present invention is based on Japanese priority application No. 2002-070516, filed on Mar. 14, 2002, the entire contents of which are hereby incorporated by reference.

What is claimed is:

1. A laser beam welding apparatus comprising:
   a component holding unit holding components that are to be welded;
   a laser irradiation unit performing welding of the components by irradiating a welding laser beam to a welding zone of the components;
   a stress detection unit detecting stress data that indicate a stress condition of the components held by the component holding unit; and
   a stress correction unit controlling irradiation of a correcting laser beam to the welding zone, based on a result of comparison between reference stress data, detected by the stress detection unit when positions of the components are aligned in proper position before the welding, and post-welding stress data, detected by the stress detection unit after the welding is performed by the laser irradiation unit, so that the post-welding stress data, obtained after the irradiation of the correcting laser beam, matches with the reference stress data.

2. The laser beam welding apparatus of claim 1 wherein the stress correction unit is configured to monitor the post-welding stress data and continue to control the irradiation of the correcting laser beam until the post-welding stress data matches with the reference stress data.

3. The laser beam welding apparatus of claim 1 wherein the stress detection unit comprises an internal-force measuring sensor that outputs stress component data indicative of a stress condition of the welded components.

4. The laser beam welding apparatus of claim 1 wherein the components that are to be welded are optical-device components, relative positions of the optical-device components being aligned in proper position where optical transmission efficiency is maximized.

5. A laser beam welding method comprising the steps of:
   holding components that are to be welded;
   performing welding of the components by irradiating a welding laser beam to a welding zone of the components;
   detecting stress data that indicate a stress condition of the components;
   storing reference stress data that are detected when positions of the components are aligned in proper position before the welding; and
   controlling irradiation of a correcting laser beam to the welding zone, based on a result of comparison between the stored reference stress data and post-welding stress data, detected after the welding is performed, so that the post-welding stress data, obtained after the irradiation of the correcting laser beam, matches with the reference stress data.

6. The laser beam welding method of claim 5 wherein the laser irradiation controlling step is configured to monitor the post-welding stress data and continue to control the irradiation of the correcting laser beam until the post-welding stress data matches with the reference stress data.

7. The laser beam welding method of claim 5 wherein, in the stress detecting step, an internal-force measuring sensor is used, the internal-force measuring sensor outputting stress component data indicative of a stress condition of the welded components.

8. The laser beam welding method of claim 5 wherein the components that are to be welded are optical-device components, relative positions of the optical-device components being aligned in proper position where optical transmission efficiency is maximized.

* * * * *